United States Patent [19]

Bullis et al.

[11] 4,074,572
[45] Feb. 21, 1978

[54] METHOD AND APPARATUS FOR SENSING THE FLUX OF A FLOWING FLUID

[75] Inventors: Robert H. Bullis, Avon; Russell G. Meyerand, Jr.; Walter J. Wiegand, Jr., both of Glastonbury, all of Conn.

[73] Assignee: United Technologies Corporation, Hartford, Conn.

[21] Appl. No.: 599,560

[22] Filed: July 28, 1975

[51] Int. Cl.² .............................................. G01F 1/64
[52] U.S. Cl. ................................................. 73/194 F
[58] Field of Search ...................... 73/194 F; 324/33; 250/356

[56] References Cited

U.S. PATENT DOCUMENTS

| | | | |
|---|---|---|---|
| 2,861,452 | 11/1958 | Morgan | 73/194 |
| 3,470,741 | 10/1969 | Durbin | 73/194 |
| 3,706,938 | 12/1972 | Petriw | 73/194 |
| 3,750,469 | 8/1973 | Storey | 73/194 |
| 3,835,705 | 9/1974 | Hadjidjanian | 73/194 |
| 3,996,795 | 12/1976 | Servassier | 73/194 |

FOREIGN PATENT DOCUMENTS

| | | | |
|---|---|---|---|
| 483,166 | 9/1929 | Germany | 73/194 |
| 945,662 | 7/1956 | Germany | 73/194 |

*Primary Examiner*—Herbert Goldstein
*Attorney, Agent, or Firm*—Anthony J. Criso

[57] ABSTRACT

Various apparatus and their applications to the determination of the flux of a fluid flowing through a region in accordance with the present invention are disclosed. The technique involved is based on the formation of charged particles within the fluid and subjecting these particles to an electric field which is colinear with the direction of fluid travel. Two charged particle collection stations are established, one upstream and the other downstream of the charged particle formation site and the resulting electric currents through such stations are correlated to the flux of the fluid.

16 Claims, 3 Drawing Figures

Fig. 3

METHOD AND APPARATUS FOR SENSING THE FLUX OF A FLOWING FLUID

BACKGROUND OF THE INVENTION

1. Field of Invention

The present invention relates to measurement of fluid flow and more particularly to the determination of the flux of a moving fluid.

2. Description of the Prior Art

Many practical fluid measurement devices involve determination of fluid flow properties in a conduit or channel of some type. Over the past 50 years or so various charged particle techniques have been proposed to measure or approximate in some degree such variables of fluid motion as velocity, mass flow or flux, flow direction, fluid pressure and temperature or density. Such flow parameters can be useful in determining the number or total mass of particles per unit time passing through a conduit.

An early teaching on the subject of fluid measurements through the use of charged particle techniques is provided by Meyer in U.S. Pat. No. 1,411,769 entitled Method Of And Apparatus For Measuring The Flow Of Fluids which issued on Apr. 4, 1922. The Meyer concept is based upon producing a gas discharge between a pair of electrodes located in a flow stream and relating changes in discharge characteristics, as measured by external electrical circuits, to changes in the properties of the flow field. While it is well known that gas discharge conditions will be influenced by the properties of the flow field, such as velocity and density, this type of approach lacks the sensitivity required to make direct velocity or mass flow determinations and can introduce major perturbations in the flow field upon which measurements are desired.

A variation of the Meyer concept which eliminates the major perturbing influence of the discharge through use of a radioactive source to produce ionization in the flow is disclosed by Blake in U.S. Pat. No. 1,808,709 entitled Apparatus For Metering Gaseous Fluids issued June 2, 1931. In the Blake apparatus a radioactive source which ionizes the flow stream is located upstream of an electrode which is placed in the flow and is electrically isolated from the metal walls of the flow conduit. By placing an electrical field of insufficient intensity to produce ionization in the gas between the electrode and conduit wall a drift field for the charged or ionized particles produced by the radioactive source is established. As ionized particles are swept downstream from the region of the radioactive source, under the action of the flow field, they are collected either on the conduit wall or the electrode. This collection of charges constitutes a current which is directly relatable to the characteristics of the flow of gas through the conduit. While this configuration offers significant improvements over the Meyer apparatus the Blake apparatus suffers from extremely low signal levels and potentially a nonlinear response to flow conditions because of the overall configuration and relationship between the source of ionization and the current collecting structure.

A more advanced flow sensing device is taught by Genin et al in U.S. Pat. No. 2,514,235 entitled System For Controlling The Charging Of Storage Batteries issued on July 4, 1950. The relevant teaching in this patent is the use of a gaseous ion source which produces a point source of ions thereby limiting the rather broad distribution (both in energy and spatial dependence) produced by the radioactive source employed by Blake. The gas is passed through a conduit having the point source of ions located on one side and a series of opposing collection electrodes. Under conditions of zero gas flow the maximum number of ions are collected on the collector positioned immediately opposite the ion source. As the gas flow transverse to the ion stream is increased the ions are deflected downstream and collected on adjacent electrodes. A further teaching of this patent is the determination of flow quantity by measuring this deflection of the ion beam produced by the flow of gas transverse thereto. While the ion collectors employed to determine deflection of the ion beam produced by the flow stream were not of a nature suitable for determining the quantative features of the ion distribution they were sufficient to make qualitative measurements relatable directly to flow quantity. Furthermore, while not taught by Genin et al the measurement of flow quantity made in this manner is directly relatable to mass flow.

A subsequent teaching indicative of the then still developing art in the field of fluid measurements is provided by Mellen in U.S. Pat. No. 2,611,268 entitled Velocity Meter Of Gas Flow issued Sept. 23, 1952. Mellen employs a radioactive source configuration similar to that of Blake but utilizes two sets of collectors, one upstream and one downstream, to detect the presence of ionization produced by the radioactive source. With this technique improved sensitivity to flow properties over that achieved by Blake is obtained. Further, flow direction in the conduit can also be ascertained.

The Mellen concept is modified in U.S. Pat. No. 2,861,452 entitled Nuclear Anemometer issued to W. A. Morgan on Nov. 25, 1958 which also teaches apparatus for measuring the velocity and direction of a gas flow. The apparatus includes a conduit having a centrally located radioactive material on axis to ionize gas passing through the conduit. Positioned upstream and downstream from the radioactive source are a first and a second cylindrical electrode having radially extending electric fields. The ions produced in the gas from the action of the radioactive source are collected by the cylindrical electrodes. Because of the action of the flow field, ions produced in the upstream region are deflected in the downstream direction. Therefore, the difference in current collected by the two cylindrical electrodes is indicative of the velocity and flow direction of the gas passing through the anemometer.

In contrast to the teachings of Mellen and Morgan, the first actual demonstation of the extremely high sensitivity that can be achieved through the use of ion deflection techniques was the work reported by W. Fucks in Gas Discharges Applied To Measurement, Appl. Sci. Res., Vol. 5, Section B, p. 167 (1955). In this work, both radioactive and corona source ionization were used to produce charged particles which were subsequently deflected across the flow stream to determine various flow characteristics such as flow stream velocity and velocity fluctuations. This work taught that under constant ion source current conditions, direct velocity determinations could be made. Other work reported by F. D. Werner et al in Investigation Of A Corona Discharge For Measurement In Air Flow, University of Minnesota Institute of Technology, Department of Aeronautical Engineering, Res. Rep. 84, (1952), clearly demonstrated through the use of a corona source and proper collector configuration that either positive or negative charged particle distributions which were deflectible in the flow stream could be detected with high resolution. As in the case of the Fucks work, Werner operated under constant source current conditions and thereby determined flow velocity. Neither of these works reported or appear to have recognized the importance of determining mass flow by using charged particle deflection techniques.

Some of the more sophisticated devices to evolve from this sequence of developing art are disclosed by Durbin in U.S. Pat. No. 3,470,741 entitled Mass Flow Meter Apparatus issued Oct. 7, 1969. The fundamental operation of this type hardware is based on the Erikson air blast method of determining ion mobility which was reported in Phys. Rev. 20 117 (1922) and is described further in Basic Processes Of Gaseous Electronics, L. B. Loeb, University of California Press, Los Angeles, Calif., 1961 pgs. 8-13. The Durbin apparatus provides an electric field transverse to the direction of flow of fluid through a duct. The field is of sufficient intensity to produce ionization at a selected corona source location. The deflection of current from the corona source produced as a result of the transverse fluid flow is used to determine mass flow through the duct. In one type embodiment a single electrode on one side of the duct is maintained at an electric potential sufficient to generate ions in the flowing fluid and a cooperating split electrode on the opposite side of the duct collects such ions. The electric field maintained between the single and split electrodes has a gradient across the duct and causes the ions to migrate transversely under the influence of this field while simultaneously moving axially due to the velocity of the fluid. When the fluid is not moving through the duct, the current to each of the split collectors is the same. However, when the fluid is in motion, a differential electric current occurs at the split collector and the current differential is correlated to the mass flow with straightforward instrumentation techniques. In a second type of embodiment, Durbin maintains a radially graduated electric field transverse to the direction of fluid flow between an ion transmitter such as a corona source on the longitudinal axis of a duct, and an ion receiving electrode which is wound along the inner wall of the duct. Then by producing ions having a known distribution with the transmitting electrode and locating the displacement in the direction of fluid flow for the median ion in the distribution, the mass flow of the fluid can be determined. The Durbin teaching requires maintaining an electric field gradient transverse to the direction of the gas flow, an ion source having a known distribution and means for measuring the net deflection due to the mass transfer of the fluid in the duct of the ions forming the distribution.

The last and most recently reported work is that of G. S. Castle and M. R. Sewell, IEEE Transactions On Industry Applications Jan./Feb. 1975, Vol. IA-11, No. 1, pgs. 119-124. In this flow sensor a radioactive source similar in concept to that of Blake, Mellen and Morgan is employed to produce a source of ionization in the flow stream. By applying an electric field transverse to the flow direction and using a split electrode configuration opposing the radioactive source location the deflection of ions produced by the action of the transverse flow field can be measured. While this apparatus in principle can be employed to measure either velocity or mass flow the signal output is only linear over a small flow range, a problem common to use of radioactive sources employed in the configurations considered, as noted previously.

SUMMARY OF THE INVENTION

A primary object of the present invention is to determine the flux of fluid passing through a conduit.

The word flux as used hereinafter is a parameter which describes the number of particles per second passing through the conduit and is defined in terms of the other fluid properties as follows:

$$\text{Flux} = N v_f A$$

where
- $N$ is the particle density of the fluid (number of particles per cubic centimeter),
- $v_f$ is the average velocity of the fluid through the conduit, (centimeters per second),
- $A$ is the cross sectional area of the conduit (square centimeters).

Multiplication of flux by the average mass (grams per particle) converts flux to mass flow (grams per second).

According to the present invention an apparatus for determining the flux of a fluid includes a region through which the fluid flows, means for providing charged particles in a substantially planar distribution which extends transversely across the region, charged particle collection means extending transversely across the region and located at both upstream and downstream stations with respect to the charged particle or ion production means, means for providing an electric field between the ion production and ion collection means, and means for determining the electric current through each ion collection means. The operation of such apparatus includes flowing a fluid along an axis through the region, producing a distribution of ions in the fluid adjacent to the ion production and central electric field establishment means and substantially transverse to the axis, subjecting such ions to an electric field which is coaxial with the direction of flow and extending between the central electric field establishment means and both an upstream and a downstream ion collection means each of which is oriented substantially transverse to the axis, determining the electric current due to the ion flow between the production means and the upstream and downstream collection means, and analyzing the magnitude of such electric currents to establish the flux of the fluid through the region.

The present invention operates such that the output signals are simply and directly relatable to flux over a broad range of pressure and flow conditions. A primary advantage of the present invention is that scaling to duct areas of arbitrary cross sectional configuration to accommodate different levels of flux can be accomplished with no increase in operating voltage. Response to changing flux conditions can be detected continuously on a millisecond time scale which is characteristic of ion transit times. Further, the apparatus is sensitive over a wide dynamic range of fluid fluxes and ambient conditions.

In many important applications such as measurements of air flux this invention retains its calibration despite significant changes in ambient pressure, temperature, and specific impurity contents of the fluid. The present invention is especially well suited to air flux measurements such as required in fuel management in an internal combustion engine, particularly those having stringent exhaust gas criteria as in automobile propulsion applications. As compared with alternative automotive air flow detecting schemes, the present apparatus is characterized by a reduced number of sensor elements, a fast response time and a high tolerance to changes in the environmental conditions such as pressure and temperature.

In many practical embodiments, the present invention is very simple in design and construction, making it inexpensive to fabricate. Also the material of apparatus construction is not critical therefore the present invention may be made compatible with operation in corrosive or otherwise hostile environments. Further, the apparatus is readily made safe with regard to high voltage owing to the operation of the external ion collecting means at substantially ground potential.

The foregoing and other objects, features and advantages of the present invention will become more apparent in the light of the following detailed description of the preferred embodiment thereof as shown in the accompanying drawing.

DESCRIPTION OF THE PREFERRED EMBODIMENT

Figure 1:
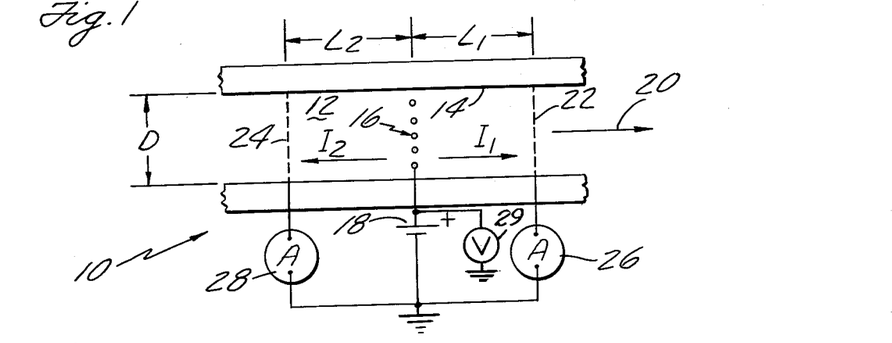
FIG. 1 is a simplified schematic through the cross section of an apparatus in accordance with the present invention.

A cross sectional view through a flux sensor 10 in accordance with the present invention is shown in FIG. 1. The sensor or detector includes a conduit 12 having a wall 14 which forms a flow path having a circular cross section of diameter D. Spaced apart across the conduit is a wire grid 16 which is connected electrically to the positive plate of a battery 18. The wires are arranged to be substantially transverse to the flow of the fluid through the conduit which proceeds in a direction 20. A first screen 22 is positioned a distance $L_1$ downstream from the positive grid 16 and a second screen 24 is positioned a distance $L_2$ upstream from this grid. Each screen extends substantially transverse to the direction of flow 20 and is connected to the grounded plate of the battery 18 to provide an electric field which is coaxial with the flow direction 20. This electric field extends from the wire grid 16 downstream to the first screen 22 and from the grid upstream to the second screen 24. A first ammeter 26 and a second ammeter 28 are in the downstream and upstream screen circuits respectively. A voltmeter 29 is connected to the grid wire 16. The wall of the conduit is formed of a material having a low electrical conductivity with the wire grid and the first and second screens electrically insulated from the conduit.

In the operation of the apparatus described, the wire grid is raised to a positive potential to produce a positive corona in the fluid flowing through the conduit. The resulting positive ions drift in the directions of the electric field with a drift velocity $$v_d = \mu E$$

where $v_d$ is the drift velocity of the positive ions along the electric field (centimeters per second), $\mu$ is the ion mobility (centimeters squared per volt-second), and $E$ is the electric field strength (volts per centimeter).

Since the fluid in which ions are formed is flowing in the direction 20, the net ion motion which is also in direction 20 is the ion drift velocity, $v_d$, increased or decreased by the fluid velocity, $v_f$. Thus the ions drifting downstream from the wire grid to the first screen have a net velocity of $$v_1 = v_d + v_f$$

where $v_1$ is the net ion velocity in the downstream direction (centimeters per second), $v_d$ is the drift velocity of the positive ions produced by the action of the applied electric field (centimeters per second), and $v_f$ is the velocity of the fluid passing through the conduit (centimeters per second).

Similarly, the ions drifting from the wire grid to the second screen have a net velocity of $$v_2 = v_d - v_f$$

where $v_2$ is the net ion velocity in the upstream direction (centimeters per second).

This positive ion travel results in electric currents $I_1$ and $I_2$ respectively which are described as $$I_1 = qn_+A(v_d+v_f),$$

and $$I_2 = qn_+A(v_d-v_f)$$

where $I_1$ is the electric current due to positive ion flow between the wire grid and the first screen (amperes), $I_2$ is the electric current due to positive ion flow between the wire grid and the second screen (amperes), $q$ is the net electric charge on each positive ion (coulombs), $n_+$ is the positive ion density (number per cubic centimeter), and $A$ is the cross sectional area of the conduit (square centimeters).

In a simple embodiment in which the first and second screens are equidistant from the grid, the difference between the two electric currents, $I_1-I_2$ is $$\Delta I = 2qn_+Av_f$$

which is a measure of the fluid velocity. Similarly, the sum of these two currents is $$\Sigma I = 2qn_+Av_d$$

which is proportional to ion drift velocity. The positive ion density, $n_+$, is not readily determinable; however, by setting up a ratio of the current difference to the current sum, the ion density term is eliminated and $$\Delta I/\Sigma I = v_f/v_d.$$

The ion drift velocity, $v_d$, is known to be related to the electric field potential, E, and the ion mobility, $\mu$, by the relationship $$v_d = \mu E.$$

Also the ion mobility is known to be inversely proportional to the fluid particle density so that $$\mu = \mu_o(N_o/N)$$

where
- $\mu_o$ is the ion mobility at standard conditions of temperature and pressure,
- $N$ is the particle density of the fluid passing through the conduit (number of fluid particles per cubic centimeter), and
- $N_o$ is the particle density of the fluid at standard conditions of temperature and pressure (number of fluid particles per cubic centimeter).

Further, if gas pressure or electric field change $\mu_o$ will remain constant for a given ion as long as the gas discharge parameter E/P is kept below ten volts per centimeter-Torr where
- E is the electric field (volts per centimeter), and
- P is the pressure of the fluid which contains the ions (Torr).

Thus, if the electric field gradient is less than about 7600 volts per centimeter at atmospheric pressure, $\mu_o$ for a given ion is independent of E/P.

Since in this embodiment, E = V/L, the ratio of the current difference to the current sum is $$\frac{\Delta I}{\Sigma I} = \frac{v_f}{v_d} = \frac{v_f N L A}{\mu_o N_o V A} = K N v_f A \quad \text{or}$$

$$\Delta I/\Sigma I = K(\text{Flux})$$

where
- L is the linear distance over which the ions drift (centimeters),
- V is the electric potential at which the wire grid is maintained over the screen (volts),
- K is the arbitrary parameter $L/\mu_o N_o V A$ (seconds per particle), and
- flux is the parameter $N v_f A$ (particles per second).

The quantity flux when multiplied by the mass per particle of the fluid being measured (grams per particle) is converted into the quantity termed the mass flow rate (grams per second).

The practical meaning of this relationship is that the ratio of the current difference to the current sum is proportional to the flux of the fluid through the conduit and since the proportionality factor, K, is readily determined analytically, the flux of the flowing fluid can be quickly and accurately evaluated if the quantities $I_1$, $I_2$ and V are provided. Further, if only a relative measure of the flux or mass flow rate is sought the value of the factor K need not be evaluated.

In actual embodiments of this invention, the distances $L_1$ and $L_2$ are not identical and if these distances are unequal, a zero flow correction term is required in the expression for flux. Under such conditions flux can be expressed as $$N v_f A = \frac{\mu_o N_o A (L_1 + L_2)}{2 L_1 L_2} \cdot \frac{(V)(I_1 - I_2 - \Delta I_{offset})}{(I_1 + I_2)}$$

where $$\Delta I_{offset} = (I_1 + I_2) \cdot \left(\frac{L_2 - L_1}{L_1 + L_2}\right).$$

Actual particle fluxes can be determined with this and substantially equivalent expressions using values of $I_1$, $I_2$ and V which are sensed with suitable means.

The positive ions required in the operation of a preferred embodiment of the present invention are derived from the positive corona discharges which are created about each of the individual elements of the wire grid 16, each element being circular in cross section and having a diameter of approximately one tenth millimeter. The magnitude of the electric field immediately adjacent to each wire element is highly nonuniform and in excess of the threshold required for local electrical breakdown of the fluid passing over the wires. It is in this region that the positive ions are created and in effect each of the elements in the wire grid resembles a line source of positive ions in the apparatus described.

A short distance away from the wire grid which in the present context is approximately one quarter of the characteristic spacing between the wires forming the grid, the electric field becomes substantially reduced in magnitude and essentially uniform in both the downstream and upstream directions from such point to the first and second screens. Thus, it should be apparent that the corona discharges immediately adjacent the wire grid produce the positive ions and the uniform, lower value electric field which exists over a significant extent of the region between the wire grid and the first and second screens causes the positive ions to drift while simultaneously having their motion accelerated or retarded by collisions with the molecules comprising the flowing fluid. Similarly, charged particles other than positive ions can be employed in some applications as occurs for example if the polarity of the battery 18 is reversed.

In an application in which the flowing fluid is ambient air, the positive ions initially produced in the corona region are positively charged oxygen and nitrogen molecules. However, as the result of charge exchange collisions involving oxygen the nitrogen ions are converted in a time scale measured in picoseconds to positively charged oxygen or double oxygen molecules. These positively charged oxygen ions undergo further reaction with the ever present water vapor to form positively charged hydrated protons in a sequential reaction which occurs on the time scale measured in microseconds. As is pointed out hereinabove, it is important to the maintenance of calibration of the present invention that the value of $\mu_o$ remain substantially constant regardless of the temperature, pressure, and humidity of the ambient air. It has been shown that the number of water molecules attached to the positively charged hydrogen atoms or protons is always greater than three over the temperature range of 250° to 400° Kelvin for water vapor pressures greater than one tenth Torr in air. These values of temperature and water vapor content define the extremes expected in habitable portions of the continental United States.

The mobility of the hydrated protons in air is described by the Langevin expression which is $$\mu_o = 35.9/\sqrt{\alpha m_r}$$

where
- $\alpha$ is the appropriately weighted polarizability (Bohr radii cubed) of air molecules, and
- $m_r$ is the reduced mass (atomic mass units) of the collision partners (hydrated protons and nitrogen or oxygen molecules).

Further, due to the massiveness of the ions, $m_r$ is determined primarily by the oxygen and nitrogen molecules, and since the value of $\alpha$ is a property of the air molecules, $\mu_o$ is essentially independent of the specific ion for these conditions. From the Langevin expression $\mu_o$ is 2.34 centimeters squared per volt-second when the number of water molecules attached to a proton is four and 2.16 when this number is eight. Additionally the value of $\mu_o$ for a specific ion is expected to be independent of air temperature for the range of ambient conditions. This comparison indicates that $\mu_o$ in air is insensitive to changing ambient conditions over a broad variation of parameters. Experimentation with atmospheric corona has verified the dominance of hydrated protons in air, and studies on ion mobility have shown that the value of $\mu_o$ is approximately two centimeters square per volt second for positive ions in moist air, and has also confirmed the applicability of the Langevin ion mobility theory to hydrated protons. The conclusion supported by this discussion is that the humidity inherent in the atmosphere ensures an essentially constant value of ion mobility such that the arbitrary parameter K previously discussed is insensitive to changing conditions of either humidity or temperature. This inherent insensitivity makes the present invention especially well suited in applications such as monitoring air intake to automotive internal combustion engines wherein the apparatus would be utilized to continuously set the fuel flow rate to maintain the optimum air fuel mixture.

A flux sensor according to the present invention differs from the earlier art cited hereinbefore in two important respects. This invention makes use of the drift of charged particles of one sign in determining flux rather than a plasma constituted of substantially equal numbers of positive and negative charged particles as in the case of Meyer. The second principal distinction of this invention over such prior art as typified by Durbin is the fact that the ions produced in the flowing fluid drift coaxially in the direction of the fluid flow as a result of the orientation of the applied electric field. This relationship is in contrast to the design of prior art devices which utilize an electric field extending in the direction perpendicular to the flow axis and result in higher operating voltages which can cause gas breakdown rather than a corona discharge when device dimensions become too large. The combination of these distinguishing features permits the operation of the present invention such that the measured currents are simply and directly relatable to flux.

The actual operation of this flux sensor involves several practical considerations. In the embodiment shown in FIG. 1, the conduit is made of a dielectric material such as a plastic. A significant consideration is the necessity to avoid the buildup of an electrostatic potential on the nonconducting walls of the duct since such a charging can distort the applied electric field and thereby affect the ion current sensed at the collector positions. The screens 22, 24 and the grid 16 typically form an array having spacings of approximately several centimeters between each element. Particularly in small device applications in which the conduit cross sectional area is on the order of ten square centimeters the electrostatic charging of dielectric walls can be a problem.

Figure 2:
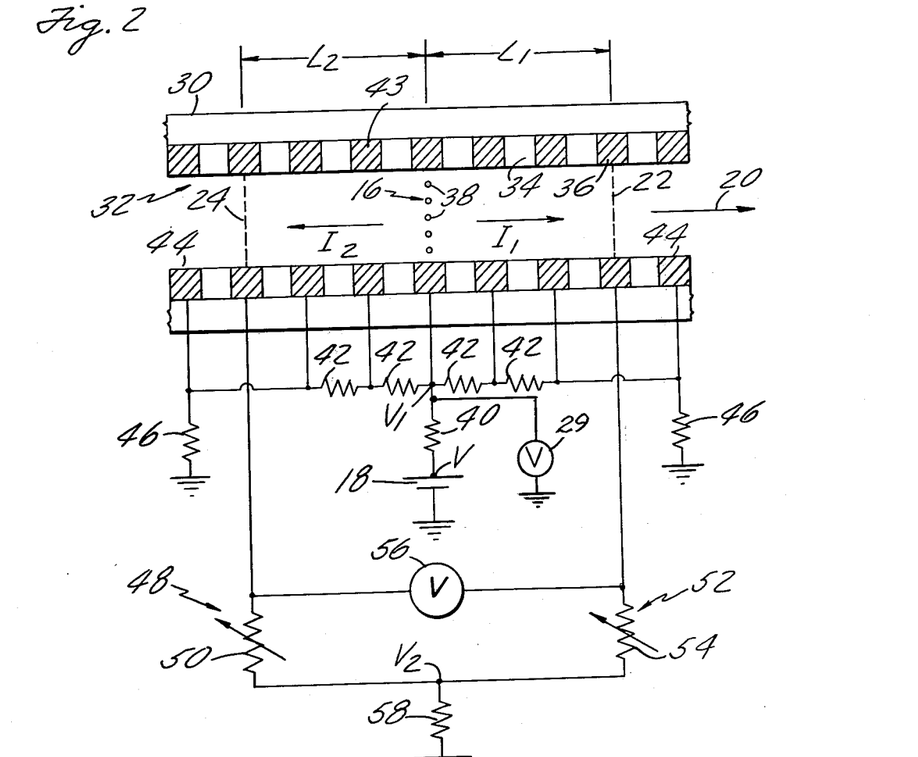
FIG. 2 is a simplified schematic showing a cross sectional view of an alternate embodiment apparatus.

An alternate embodiment of the present invention which is designed to circumvent the eleccctrostatic charging problem is shown schematically in FIG. 2. The basic conduit consists of an outer pipe 30 approximately five centimeters in diameter and an inner pipe 32 which is approximately 3¾ centimeters in diameter. The outer pipe is a plastic material and the inner pipe comprises alternately plastic rings 34 and metal rings 36. The wire grid 16 consists of five wire elements 38 each of which is a tenth millimeter diameter Nichrome wire welded to the adjacent metal ring on a 6 millimeter separation interval. The first and second screens are separated from the wire grid by several centimeters and are made from standard copper wire screening having a sufficient wire diameter to avoid the formation of any negative corona.

The battery 18 is connected in series with a primary resistor 40 which at a resistance of a hundred megohms limits the current through the wire elements 38 so that an electrical discharge cannot be maintained between such elements and the screens 22, 24. Each string resistor 42 has a resistance of 800 megohms and functions in association with its related metal ring 43 both to preserve the substantially constant electric field internal to the conduit even up to the walls and to facilitate discharging the previously uncontrolled electrostatic potential of the wall. Further, guard rings 44 are biased to approximately the same potentials as the first and second screens by guard ring resistors 46 which are nominally one tenth megohm. Additionally the guard serves to intercept surface leakage current before it can enter the electrical circuits connected to the screens 22, 24.

The positive ion currents $I_1$ and $I_2$ between the wire grid 16 and the screens 22, 24 are approximately one and one half microamperes when the positive plate of the battery 18 is maintained at a voltage of approximately twelve kilovolts. The resistances of the resistors 42 and 46 are selected such that the current through the resistors 42 is nominally of the same order of magnitude as the positive ion currents $I_1$, $I_2$. Since the ohmic value of the primary resistor 40 is relatively small, the potential difference between the wire grid and the first and second screens is not greatly different from the magnitude of the battery voltage. A voltmeter 29 is connected to the wire grid 16 to measure the voltage $V_1$ of the grid with respect to ground. Also, a rheostat 48 having a resistance 50 which is typically one hundred kilohms and a rheostat 52 having a resistance 54 which is typically one hundred kilohms are located in the ion current screen collector circuit to provide easily measured voltage drops which are typically several volts. Theoretically the electric field extending upstream from the wire grid 16 is equal to the electric field extending downstream from the grid so that the upstream ion current $I_2$ is equal to the downstream ion current $I_1$ in the absence of fluid motion. As a practical matter the spacings between the grid 16 and the collector screen 22, 24 are often not precisely identical such that a current difference is observed even at zero velocity fluid flow. This condition is offset by adjusting the effective resistance of the rheostats 48, 52.

A measurement of the potential difference between the rheostats 48 and 52 is made with a voltmeter 56. The magnitude of this difference $\Delta V$ is similar to the measured quantity $\Delta I$ and therefore can be expressed as $$\Delta V = qn_+A\left[\frac{\mu_o N_o V}{N}\left(\frac{R_{54}}{L_1} - \frac{R_{50}}{L_2}\right) + v_f(R_{54} - R_{50})\right] \text{ where}$$

$\Delta V$ is the potential difference across the rheostats (volts),
$R_{54}$ is the resistance of the rheostat 52 (ohms), and
$R_{50}$ is the resistance of the rheostat 48 (ohms).
The device is nulled under conditions of zero flow velocity by adjusting the value of either of the resistances 50, 54 to compensate for the inequality of the distances $L_1$ and $L_2$. Thus, $$\Delta V = qn_+Av_f(R_{54} - R_{50})$$

when $$R_{54}/L_1 = R_{50}/L_2$$

Similarly $V_2$ is a measure of $\Sigma I$ and therefore $$V_2 = (I_1 + I_2)R_{58} \quad \text{or}$$

$$= qn_+A\left[\frac{\mu_o N_o V R_{58}}{N}\left(\frac{1}{L_1} + \frac{1}{L_2}\right)\right] \quad \text{where}$$

where
$V_2$ is a sum voltage which is proportional to the total of the currents $I_1$ and $I_2$ (volts), and
$R_{58}$ is a summing resistor (ohms).
Consequently, the ratio of $\Delta V$ to $V_2$ can be shown to be proportional to the flux of air through the conduit as expressed $$\frac{\Delta V}{V_2} = \frac{(R_{54} - R_{50})L_1 L_2}{\mu_o N_o V R_{58}(L_1 + L_2)A}(Nv_fA).$$

Figure 3:
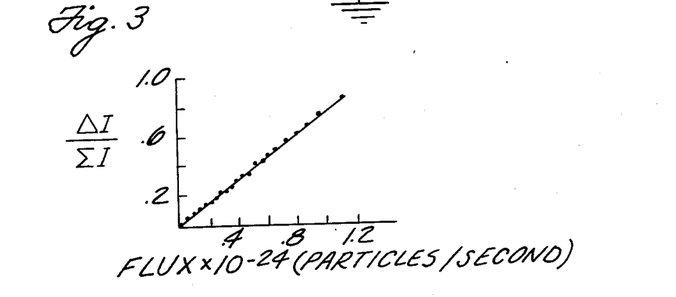
FIG. 3 is a plot showing the fractional current change through the first and second ion collection means as a function of the flux of the fluid passing through an apparatus such as is shown in FIG. 2.

Air flux measurements were made with the apparatus shown in FIG. 2 by varying the gas velocity between approximately 45 centimeters per second and 4500 centimeters per second. The resulting air flow rate data are shown in FIG. 3 and verify that fractional current changes observed at the first and second screens are in fact proportional to the gas throughput over an operating flux range extending approximately two orders of magnitude.

Furthermore, signals obtained for over a factor of three change in gas pressures at various flow velocities also exhibited the linear dependence on mass flow. This result confirms that an apparatus of this design does indeed measure flux.

The response time of this apparatus is a function of the longest transit time of ions moving from the wire grid 16 to the second screen 24 and is equal to the separation distance $L_2$ divided by the ion upstream velocity, $v_d - v_f$. A typical value for this transit interval is several hundreds microseconds. Since automobile engine response requirements are typically milliseconds, clearly this apparatus is suitable for such applications.

In the present invention, the ratio of $\Delta I$ to $\Sigma I$ should be as large as possible while maintaining the drift velocity of the ion greater than the velocity of the fluid through the conduit. The relationship between this ratio, the fluid velocity and the drift velocity is provided above and based on this relationship a realistic maximum value of the current ratio $\Delta I/\Sigma I$ would appear to be on the order of seven tenths. However, as is apparent from FIG. 3, apparatus has been operated satisfactorily somewhat beyond this value.

In applications in which the gas throughput in the conduit can be successfully approximated, the cross sectional area requirements for the duct can be estimated if the drift velocity of the ion is computed. As a practical matter, the ion drift velocity in air at atmospheric conditions is approximately ten thousand centimeters per second so that the air velocity through the conduit should probably be kept below approximately seven thousand centimeters per second.

The charged particle production means in the embodiments shown in FIGS. 1 and 2 is a positive corona ion source comprised of an array of fine wires maintained at high potential relative to the ion collection means. Clearly alternate means can be introduced for the purpose of producing the required charged particles so that the electric potential applied between the wire grid and the screens can be tailored specifically and for the sole purpose of maintaining the electric field required for appropriate ion drift. One such alternate means is to provide charged particles in the immediate region of the grid 16 through the agency of an external source of ionization such as x-rays, ultra-violet radiation, or energetic charged particle beams. A second alternative means of producing the required ions is the initiation of a glow discharge between adjacent and electrically separated wires 38 of the grid 16 using a secondary power source. These and other means of providing charged particles which have special advantages in certain specific applications should be apparent to those skilled in the art.

Although the present invention has been shown and described with respect to preferred embodiments thereof, it should be understood by those skilled in the art that various changes and omissions in the form and detail thereof may be made therein without departing from the spirit and scope of the invention.

Having thus described a typical embodiment of our invention, that which we claim as new and desire to secure by Letters Patent of the United States is:

1. Apparatus for determining the flux of a fluid having a particle density N comprising:
    means for providing a region having an axis along which the fluid flows in passing therethrough, the region having a cross sectional area A which is perpendicular to the axis;
    charged particle source means capable of maintaining an electric potential V and extending essentially perpendicular to the flow axis to provide charged particles in the fluid adjacent to the source means;
    first collection means separated from the charged particle source means by a distance $L_1$ and extending across the region essentially perpendicular to the flow axis to collect charged particles which drift from the charged particle source means along the flow axis in the direction of flow of the fluid and form a first electric current, $I_1$, said first means being capable of either a positive or negative electric potential with respect to the charged particle source means;
    second collection means separated from the charged particle source means by a distance $L_2$ and extending across the region essentially perpendicular to the flow axis to collect charged particles which drift from the charged particle source means along the flow axis in the direction opposite to the flow of the fluid and form a second electric current, $I_2$, said second collection means being capable of an electrical potential which is of the same sign as the potential of the first collection means;

means for providing an electric field E, essentially coaxial with the direction of fluid flow between the charged particle source means and both the first and second collection means to induce charged particles to drift parallel to the axis toward the first and second collection means, the strength of the field E and the pressure of the fluid P allowing the operating range in the ratio E/P to cause the ion mobility at standard conditions of temperature and pressure to remain constant between the first and second collection means;

means for sensing the first electric current $I_1$;

means for sensing the second electric current $I_2$; and means for sensing the potential difference between the charged particle source means and the first and second collection means to allow a combining of $I_1$, $I_2$ and V with the apparatus parameters A, $L_1$ and $L_2$, and the number density of particles at standard conditions $N_o$, with the standard ion mobility of the fluid, to directly relate the fluid flux passing through the area A to the ratio of the difference in the electric currents, $(I_1-I_2)$ to the sum of the electric currents, $(I_1+I_2)$.

2. The invention according to claim 1 wherein the means for providing the region is a duct.

3. The invention according to claim 2 wherein the charged particle source means extends across the duct and the charged particles in the fluid are ions.

4. The invention according to claim 3 wherein the ions are positively charged ions.

5. The invention according to claim 4 wherein the first collection means is downstream of the charged particle source means at a separation distance $L_1$ and the second collection means is upstream of the charged particle source means at a separation distance $L_2$.

6. The invention according to claim 5 wherein $L_1$ is equal to $L_2$.

7. The invention according to claim 6 wherein the ratio of the electric field strength E to the pressure of the fluid flowing through the duct is essentially equal to or less than ten volts per centimeter-Torr.

8. The invention according to claim 7 wherein the velocity, $v_d$, at which the ions drift along the axis of the duct under the influence of the electric field is at least greater than the magnitude of the velocity, $v_f$, at which the fluid is moving through the conduit.

9. The invention according to claim 8 wherein the duct material has a high electrical resistivity.

10. The invention according to claim 9 wherein the fluid is any ionizable gas.

11. The invention according to claim 9 wherein the fluid is either air or an air-fuel mixture.

12. The invention according to claim 11 wherein the particle flow rate of the fluid through the duct is measured as flux in units of particles per second and defined as $Nv_fA$ according to the relationship $$Nv_fA = \frac{\mu_o N_o A(L_1+L_2)}{2L_1L_2} \cdot \frac{(V)(I_1-I_2-\Delta I_{offset})}{(I_1+I_2)}$$

where

N is the particle density of the fluid,
$v_f$ is the velocity of the fluid,

A is the cross sectional area of the duct,
$I_1$ is the first electric current,
$I_2$ is the second electric current,
$\mu_o$ is the mobility of the positive ions at standard conditions,
$N_o$ is the particle density of the fluid at standard conditions,
V is the electric potential between the ion source means and the collection means,
$L_1$ is the linear distance over which the ions drift in the direction of fluid motion,
$L_2$ is the linear distance over which the ions drift in the direction opposite to that of fluid motion, and
$\Delta I_{offset}$ is the zero flow offset current given by the expression $$\Delta I_{offset} = (I_1+I_2) \cdot \left(\frac{L_2-L_1}{L_1+L_2}\right).$$

13. The invention according to claim 2 wherein the first and second collection means are metal screens.

14. The invention according to claim 13 wherein the charged particle source means is a wire grid.

15. The method of measuring the mass flow of a fluid including the steps of:

flowing the fluid along an axis;

creating a region of charged particles in the fluid substantially transverse to the axis wherein the region through which the fluid passes has a cross sectional area A;

applying a substantially uniform electric field along the flow axis between the region of charged particles and both an upstream charged particle collector and a downstream charged particle collector;

maintaining the electric field (E) to fluid pressure P ratio, E/P such that the ion mobility at standard conditions of temperature and pressure remain constant in the region between the upstream and downstream charged particle collector;

sensing the electric current flow due to the movement of charged particles from the region of charged particles to the upstream and downstream collectors respectively;

sensing the potential difference V between the charged particle source region and the upstream and downstream charged particle collectors;

determining the distances $L_1$ and $L_2$ between the upstream and downstream collectors and the charged particle source region;

determining the ratio of the difference and the sum of the upstream and downstream currents, multiplying this ratio by the reduced ion mobility $\mu_o$, the gas density at standard conditions $N_o$, the applied potential V, and the cross sectional area of fluid flow region A, and dividing this product by the appropriately weighted ratio of drift field lengths $L_1$ and $L_2$; and multiplying the resulting value by the average mass of the fluid particles.

16. The invention according to claim 15 wherein the fluid flows through a duct, and the upstream and downstream currents and the electric field interact according to the relationship $$Nv_fA = \frac{\mu_o N_o A(L_1+L_2)}{2L_1 L_2} \cdot \frac{(V)(I_1-I_2-\Delta I_{offset})}{(I_1+I_2)} \quad \text{where}$$

$I_1$ is the electric current in the downstream direction, $I_2$ is the electric current in the upstream direction, $L_1$ is the linear distance over which the charged particles travel to the downstream collector, $L_2$ is the linear distance over which the charged particles travel to the upstream collector, $\mu_o$ is the mobility of the charged particles at standard conditions, $N_o$ is the particle density of the fluid at standard conditions, $A$ is the cross sectional area of the duct, $V$ is the electric potential maintaining the electric field, $N$ is the particle density of the fluid, $v_f$ is the velocity of the fluid, and $\Delta I_{offset}$ is the zero flow offset current given by the expression $$\Delta I_{offset} = (I_1+I_2) \cdot \left( \frac{L_2-L_1}{L_1+L_2} \right).$$

* * * * *

UNITED STATES PATENT OFFICE
CERTIFICATE OF CORRECTION

PATENT NO. : 4,074,572
DATED : February 21, 1978
INVENTOR(S) : ROBERT H. BULLIS ET AL It is certified that error appears in the above-identified patent and that said Letters Patent are hereby corrected as shown below:

Column 1, line 23    "1,411,769" should read -- 1,411,796 --

Signed and Sealed this

Sixth Day of June 1978

[SEAL]

Attest:

RUTH C. MASON
Attesting Officer

DONALD W. BANNER
Commissioner of Patents and Trademarks